United States Patent [19]

Kundu et al.

[11] Patent Number: 5,218,649
[45] Date of Patent: Jun. 8, 1993

[54] IMAGE ENHANCEMENT SYSTEM
[75] Inventors: Amlan Kundu, Williamsville, N.Y.; V. Ramamoorthy, St. Louis, Mo.
[73] Assignee: U S West Advanced Technologies, Inc., Boulder, Colo.
[21] Appl. No.: 519,128
[22] Filed: May 4, 1990
[51] Int. Cl.$^5$ .............................................. G06K 9/36
[52] U.S. Cl. ..................................... 382/54; 382/22; 358/166; 358/167
[58] Field of Search ............................. 382/54, 52, 22; 358/166, 167

[56] References Cited

U.S. PATENT DOCUMENTS

| | | | |
|---|---|---|---|
| 4,198,612 | 4/1980 | Morton | 333/17 R |
| 4,603,430 | 7/1986 | Sacks | 382/28 |
| 4,622,537 | 11/1986 | Aiko | 340/347 |
| 4,672,567 | 6/1987 | Kelly et al. | 364/572 |
| 4,682,230 | 7/1987 | Perlman et al. | 358/167 |
| 4,691,366 | 9/1987 | Fenster et al. | 382/54 |
| 4,853,970 | 8/1989 | Ott et al. | 382/22 |

OTHER PUBLICATIONS

Foster, John, et al., "Finite-State Vector Quantization for Waveform Coding," *IEEE Transactions on Information Theory*, vol. IT-31, No. 3, May 1985, pp. 348-359.
Gray, Robert M., "Vector Quantization," *IEEE ASSP Magazine*, Apr. 1984, pp. 4-29.
Hodges, J. L., Jr., "Efficiency in Normal Samples and Tolerance of Extreme Values for Some Estimates of Location," Fifth Berkeley Symposium, pp. 163-185.
Hodges, J. L., Jr., and E. L. Lehmann, "Estimates of Location Based on Rank Tests," University of California, Berkeley, pp. 598-611.
Kim, Taejeong, "New Finite State Vector Quantizers for Images," Proceedings of ICASSP-88, vol. II (M), Apr. 1988, pp. 1180-1183.
Kundu, Amlan, and Sanjit K. Mitra, "A New Algorithm for Image Edge Extraction Using a Statistical Classifier Approach," *IEEE Transactions on Pattern Analysis and Machine Intelligence*, vol. PAMI-9, No. 4, Jul. 1987, pp. 569-577.
Ramamoorthy, V., N. S. Jayant, Richard V. Cox, and Man Mohan Sondhi, "Enhancement of ADPCM Speech Coding with Backward-Adaptive Algorithms for Postfiltering and Noise Feedback," *IEEE Journal on Selected Areas in Communications*, vol. 6, No. 2, Feb. 1988, pp. 364-382.
Ramamoorthy, V., and N. S. Jayant, "High Quality Image Coding with a Model-Testing Vector Quantizer and a Human Visual System Model," Proceedings of ICASSP-88, vol. II (M), Apr. 1988, pp. 1164-1167.
Ramamoorthy, V., and N. S. Jayant, "On Transparent Quality Image Coding Using Visual Models," SPIE/O-E-LASE-89 Conference, Los Angeles, California, Jan. 15-20, 1989.
Ramamurthi, Bhaskar, and Allen Gersho, "Edge-Oriented Spatial Filtering of Images with Application to Post-Processing of Vector Quantized Images," Proceedings of ICASSP-84, Apr. 1984, pp. 48.10.1-48.10.4.
Safranek, R. J., K. MacKay, N. S. Jayant and T. Kim, "Image Coding Based on Selective Quantization of the Reconstruction Noise in the Dominant Sub-Band," Proceedings of ICASSP-88, vol. II (M), Apr. 1988, pp. 765-768.
HS Statutory Invention Registration H681 Weideman, Sep. 5, 1989.

*Primary Examiner*—Michael T. Razavi
*Assistant Examiner*—Yon Jung
*Attorney, Agent, or Firm*—Timothy R. Schulte

[57] ABSTRACT

A system for enhancing the quality of an image that suffers from staircase effects, contouring effects, and granular noise, without affecting the existing method of creating the image is disclosed. The enhancement system identifies the edge and nonedge regions in the decoded image, and then filters those regions in order to reduce the specific type of quality degradation that generally occurs in the specific type of region. The system is integrated into a processing system including means for receiving and displaying digital image data. The system receives the digital image data, differentiates between edge data and the nonedge data within the digital image data, and filters the image data accordingly. The filtered edge data and the filtered nonedge data are combined to form an enhanced image. A multipass filtering system is also disclosed.

11 Claims, 7 Drawing Sheets

IMAGE ENHANCEMENT SYSTEM

TECHNICAL AREA OF THE INVENTION

This invention relates to a system for image enhancement and, more particularly, to a system for enhancing the quality of a decoded quantized image.

BACKGROUND OF THE INVENTION

As the state of the art of digital signal technology advances, related technologies such as digital image processing experience corresponding growth and benefits. For example, the development and proliferation of facsimile communications allows images to be encoded into digital signals, transmitted over conventional telephone line, and decoded into a close representation of the original images. Image data are also digitally encoded for ease of storage, modification, copying, etc. As is common experience with growing technologies, the field of digital image processing is also experiencing problems with applications in new areas.

Problems in the area of digital image processing (coding) relate generally to achieving a balance between acceptable image distortion and bit rate transmissions. In order to increase the efficiency and therefore the usefulness of digital image decoding schemes, the coding system must provide a coded set of image data that is more efficient to store, transmit, etc., than the original image data and must reproduce a decoded image with some minimum level of quality. However, the conversion of relatively high bit rate image data to lower bit rate data virtually always entails a loss of image quality.

One straightforward method for coding an image is to create an artificial grid over the image and to assign a value to each grid space representing the color of the original image at that grid space. If the grids are made small enough and the values represent a large enough range of color, then the image may be encoded and decoded with small image quality degradation. For example, display screen images are made up of an array of pixels, i.e., picture elements. On a black and white screen, each pixel has a value of one or zero representing the on/off state of the pixel. In a one-to-one bit-to-pixel coding scheme, each pixel value is represented as a 1 or as a 0 and the entire screen image is encoded. The result of the encoding is an array of binary values. To decode the image, the array values are translated into a screen image having pixels on or off in the same order in which they were originally encoded.

If the image is comprised of more than two distinct colors, then more than a 1-bit code must be used to represent the pixel values. For example, if four distinct colors are present in the image, a 2-bit binary code can represent all of the values. If the image includes 256 distinct colors, a 8-bit binary codes is required to uniquely represent each of the color values. The memory requirements for such coding schemes increase as the number of distinct colors in the image increases. However, with high bit rate coding schemes, the quality of the image that results from the decoding of the digital data will be good as long as the digital image transmission or recovery from storage is successful.

When an encoding scheme converts a single value, i.e., a single value representing a pixel, into a coded value, the scheme is commonly referred to as scalar encoding. A vector encoding scheme is similar to a scalar scheme except that input vector data rather than scalar data are encoded. With vector data, more than one dimension of the pixel can be described. Vector encoding schemes are useful for image coding when the image is made up of elements having both color and shading characteristics, i.e., intensity, as well as for the coding of other analog data or very high rate discrete data. For example, an image may be comprised of pixels having 8 colors, each of which can assume 4 shades. Each of the pixel values could then be represented by a 2-dimensional vector. The first vector field is a 3-bit binary value for color; the second vector field is a 2-bit binary value for shade. Thus, in order to exactly encode the image, each vector would require 5-bits of data to represent a single pixel value.

To reduce the size of the encoded digital image, bit-to-pixel ratios other than one-to-one or many-to-one are used. A lower bit rate reduces the amount of digital image data that must be stored, transmitted, etc. A number of quantization schemes have been designed to control data encoding and decoding in order to produce a lower bit rate.

Vector quantizers map a number of unique input vectors onto a smaller number of output vectors in order to reduce the bit rate. For example, a set of 100 unique input vectors might be mapped to a set of 10 output vectors that have been determined by a quantizer designer to be representative of the input vector set. The bit rate reduction achieved is that the input vector set requires a 8-bit binary code to represent all of the values and the output vector set requires only a 5-bit code. Each input vector is mapped to the output vector that is "closed" to the input vector. For example, if the input vector (2, 2) and two of the output vectors are (3, 4) and (5, 5), the input vector would be mapped to the output vector (3, 4) because it most closely represents the input vector. The goal of the mapping is to obtain a cluster of input vectors around each output vector. Each input vector is then represented by the closest output vector. The output vectors are then encoded into a binary code. When the output vectors are decoded and the decoded image assembled, the decoded image lacks the detail of the original image. The decoded image is constructed only from the output vectors, which do not correspond exactly to the original input vectors. One of the major focuses of vector quantization design is the balance between the size of the output vector set and the bit rate.

Decoding images, constructed by a low bit rate scheme, generally suffer from the following types of degradations: (a) edge regions in the decoded image contain staircase effects, (b) quasi-constant or slowly varying regions suffer from contouring effects, and (c) textured regions lose detail and suffer from granular noise. These problems arise in images encoded/decoded by both scalar and vector quantization schemes. For low bit rate coding applications, an acceptable rate of transmission lies in the range of 0.2 bit/pixel to 1 bit/pixel. At these rates, the staircase and contouring effects are pronounced and affect the visual quality of the decoded image.

Staircase and contouring effects in a decoded image are generally fairly obvious to the naked eye. The staircase effect is the blockiness that occurs at an edge region, i.e., a region wherein two distinct pixel value regions meet. A staircase effect is produced by the fact that there are fewer output vector values than input vector values and thus the intensity changes along decoded edge regions are more pronounced. Additionally, most quantizers tend to convert diagonal edge regions into staircase type regions due to the encoding schemes. The contouring effects that appear in the slowly varying regions are also be caused by the fact that not all of the variations in the intensity of the original image are available for the decoded image. For example, if a region of the original image included an area having 4 intensity changes therein, the decoded image might represent the area with only 2 intensities. In contrast to the staircase effects and the contouring effects, the effect of the granular noise on the viewed image is often mitigated by the very nature of the textured regions. However, some blockiness is still likely to be visible in these regions due to the lower bit rate, i.e., the decrease in intensity variation.

Each of the degradations represents a loss of fidelity of the decoded image from the original image. In vector quantization systems, the three common types of degradation can be traced to the finite size of the set of encoding values, the distortion measure used in the quantizer design, i.e., how close the input values must be to the encoded values, and the finite training procedure involved in the design of the quantizer. Most present systems for enhancing decoded images are directed toward modifying the operations of the quantizer or encoding system and/or modifying the bit rate.

The present invention is directed to a system for enhancing the quality of a decoded image at the image decoder without affecting the operation of the quantizer or other encoding method and without increasing the bit rate. Because the system does not affect the encoding or transmission processes, it can be readily integrated into established quantizer systems. The present invention is suitable for enhancing any decoded image whether it is a stored digital image or an image received in real time.

SUMMARY OF THE INVENTION

The present invention provides a system for enhancing the quality of an image that suffers from staircase effects, contouring effects, and granular noise, without affecting the existing method of creating the image. The present system identifies the various regions in the decoded image, e.g., edge and nonedge regions, and then filters those regions in order to reduce the specific type of quality degradation that has occurred in the region. The present system can be integrated into a vector quantization transmission system and will not affect the vector quantization process or the bit rate of transmission.

In accordance with additional aspects of the present invention, the system is integrated into a processing system including means for receiving and displaying an image comprised of digital data. The method of the present invention comprises the steps of receiving a digital image, differentiating between edge data and the nonedge data within the digital image data, and filtering the image data accordingly so as to decrease the staircase effects appearing in the edge data and to decrease the loss of detail and contouring effects appearing in the nonedge data. The method also includes the step of integrating the filtered edge data and the filtered nonedge data into an enhanced image.

In accordance with still further aspects of the present invention, the method includes a second filtering step to further decrease the image degradation in the enhanced image. The filtering of the image data is again performed according to whether the image data is identified as edge or nonedge data.

In accordance with other aspects of the present invention, prior to differentiating between the edge and nonedge data, a subimage of the digital image is formed. The edge and nonedge data comprising the subimage are differentiated and filtered. The boundaries of the image are not filtered because of the sliding window filtering technique that is used. The method includes a final step of integrating the nonfiltered portion of the digital image with the enhanced subimage to form a complete enhanced image.

In accordance with additional aspects of the present invention, the step of differentiating between edge and nonedge regions is carried out by analyzing the digital image via an edge detector. Further, the edge filtering means is a median filtering process and the nonedge filtering means is a statisical D-filtering process.

DETAILED DESCRIPTION OF THE PREFERRED EMBODIMENT

Figure 1:
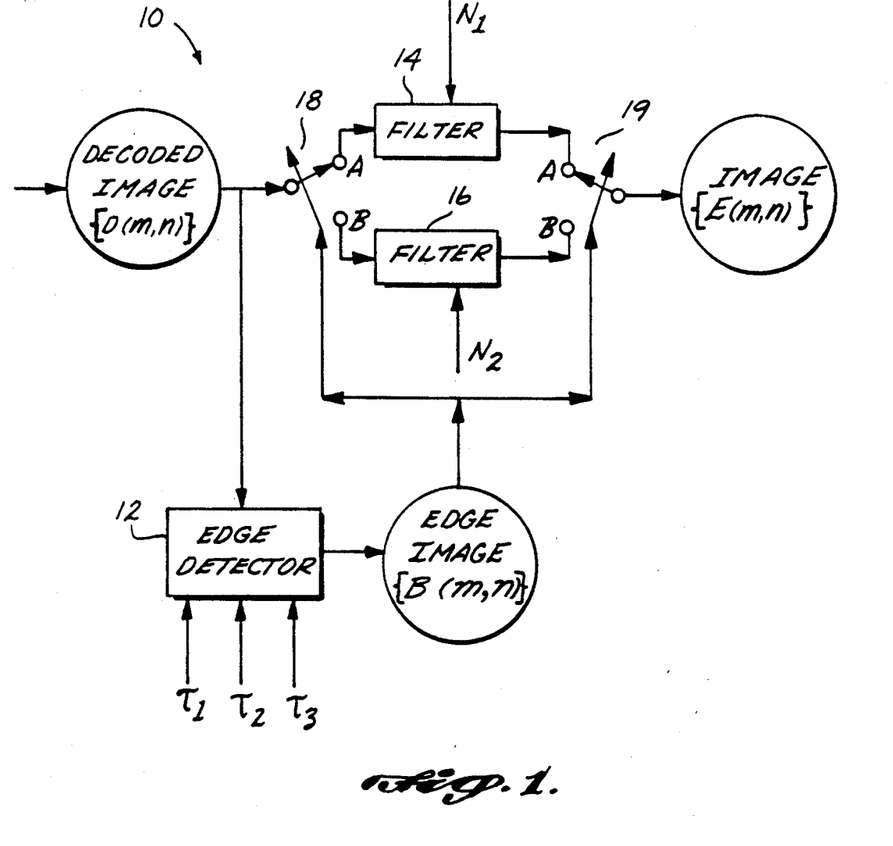
FIG. 1 is a block diagram of the enhancement system of the present invention.

With reference to FIG. 1, an image enhancement system 10 includes an edge detector 12, a nonedge filter 14, and edge filter 16, and filter switches 18 and 19. A decoded image $\{D(m,n)\}$ is input into the system. The image $\{D(m,n)\}$ is partitioned into edge and nonedge regions via edge detector 12. An edge image $\{B(m,n)\}$ is generated by the edge detector. The image $\{B(m,n)\}$ is input to the switches 18 and 19 to control the image filtering process. The one-pole-two-way filter switches 18 and 19 operate synchronously to connect image $\{D(m,n)\}$ to the input of filter 14 or 16 and to connect the appropriate filter output to an output which constitutes an enhanced image $\{E(m,n)\}$. The enhanced image $\{E(m,n)\}$ has improved image quality over the image $\{D(m,n)\}$.

The decoded image degradation is minimized by filtering the nonedge portions of the image with a filter that smooths the blockiness, contouring, and noise effects of the decoded image. The filtering process integrates some of the pixel value variation that was decreased during the coding process back into the decoded image. The edge portions of the image are smoothed by the edge filter in order to decrease the staircase effect at the edge regions.

Control of the enhancement quality is obtained by adjusting the values of the edge detector parameters $\tau_i$ and the filter parameters $N_i$. The exact parameters and their effect on the image enhancement process depend on the specific edge detector and filters that are used. Generally, however, an edge detector includes parameters that define the sensitivity of the detector to edge sharpness and edge width; and filters include parameters that define the size of the image area to be filtered. In one actual embodiment of the present invention, an edge detector referred to as a Kundu-Mitra edge detector, a statistical D-filter, and a median filter are implemented as the edge detector 12, nonedge filter 14 and edge filter 16, respectively. The Kundu-Mitra edge detector is described in A. Kundu and S. K. Mitra, "A New Algorithm for Edge Image Extraction Using Statistical Classifier Approach," *IEEE Transactions on Pattern Analysis and Machine Intelligence*, July 1987, pp. 569-477. A statistical D-filter is described in J. L. Hodges, Jr. and E. L. Lehmann, "Estimation of Location Based on Rank Tests," *Annals of Mathematical Statistics*, 1965, pp. 598-611. A median filter is described in T. A. Nodes and N. C. Gallagher, Jr., "A generalization of Median Filtering using Linear Combinations of Order Statistics," *IEEE Transactions Acoustics, Speech, and Signal Processing, Vol. ASSP-30*, October 1982, pp. 739-746.

In a Kundu-Mitra edge detector, the edge detector operation is controlled by the values assigned to threshold parameters $\tau_1$, $\tau_2$, and $\tau_3$. Empirical studies indicate that suitable value ranges for these parameters are:

$$20 \leq \tau_1 \leq 40;$$

$$8 \leq \tau_2 \leq 20;$$

$$1.6 \leq \tau_3 \leq 2.3;$$

A higher value in the range for the threshold parameter $\tau_1$ causes the edge detector to detect stronger edges, i.e., edges that are composed of at least two values that are considerably different thereby producing a sharp edge. Similarly, a lower value in the range for the threshold parameter $\tau_2$ results in the detection of stronger edges. On the other hand, a higher value in the range for the threshold parameter $\tau_3$ results in the detection of thinner edges, i.e., detected edges are close to one pixel thickness.

In the statistical D-filter and the median filter, the window size parameters $N_1$ and $N_2$ are assigned values to affect the filtering operations. Generally, the window size parameters assume values from $Z+ = \{1, 3, 5, 7, \ldots\}$. Desirable parameter values or value ranges have been determined by empirical studies of viewer response to a comparison of the original image and the enhanced decoded image and to general quality of the enhanced decoded image. In the present invention, the parameter values are controlled interactively or may be initialized prior to starting the enhancement process.

Figure 2:
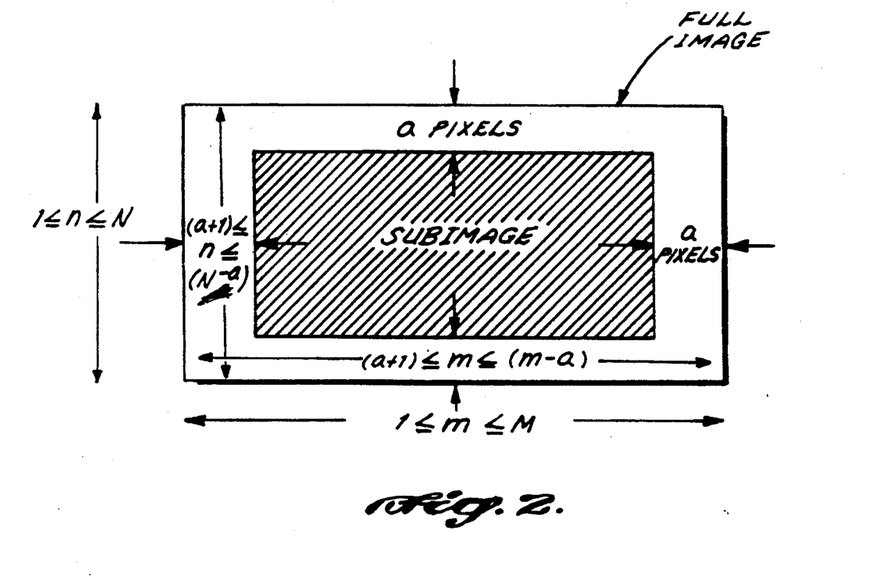
FIG. 2 is a sample decoded digital image $\{D(m,n)\}$.

With reference to FIG. 2, the decoded image is denoted by $\{D(m,n), 1 \leq m \leq M, 1 \leq n \leq N\}$, where the integer pair $(m,n)$ denotes the spatial coordinates of a pixel and the image size is $M \times N$ pixels. The notation $D(m,n)$ denotes the intensity value of the pixel. In the present example, each pixel has 256 levels of grey. Thus, $D(m,n)$ assumes integer values between 0 and 255.

Upon receiving the decoded image $\{D(m,n)\}$, a subimage $\{D_S(m,n)\}$ is identified within the decoded image. The subimage is defined as $\{D_S(m,n) = D(m,n)$ for $(a+1) \leq m \leq (M-a)$ and $(a+1) \leq n \leq (N-a)\}$, wherein $a$ is the border size parameter. A border that is $a$ pixels wide around the image $\{D(m,n)\}$ is not enhanced by the enhancement system because of the positioning of the filter windows in statistical D-filtering and median filtering techniques. At the end of the enhancement procedure, the unfiltered decoded image border is combined with the filtered subimage $\{E_S(m,n)\}$ to produce the complete enhanced image $\{E(m,n)\}$. The border size is chosen in relation to the filtering window sizes. In the present example, the border size parameter $a = 3$.

Figure 3:
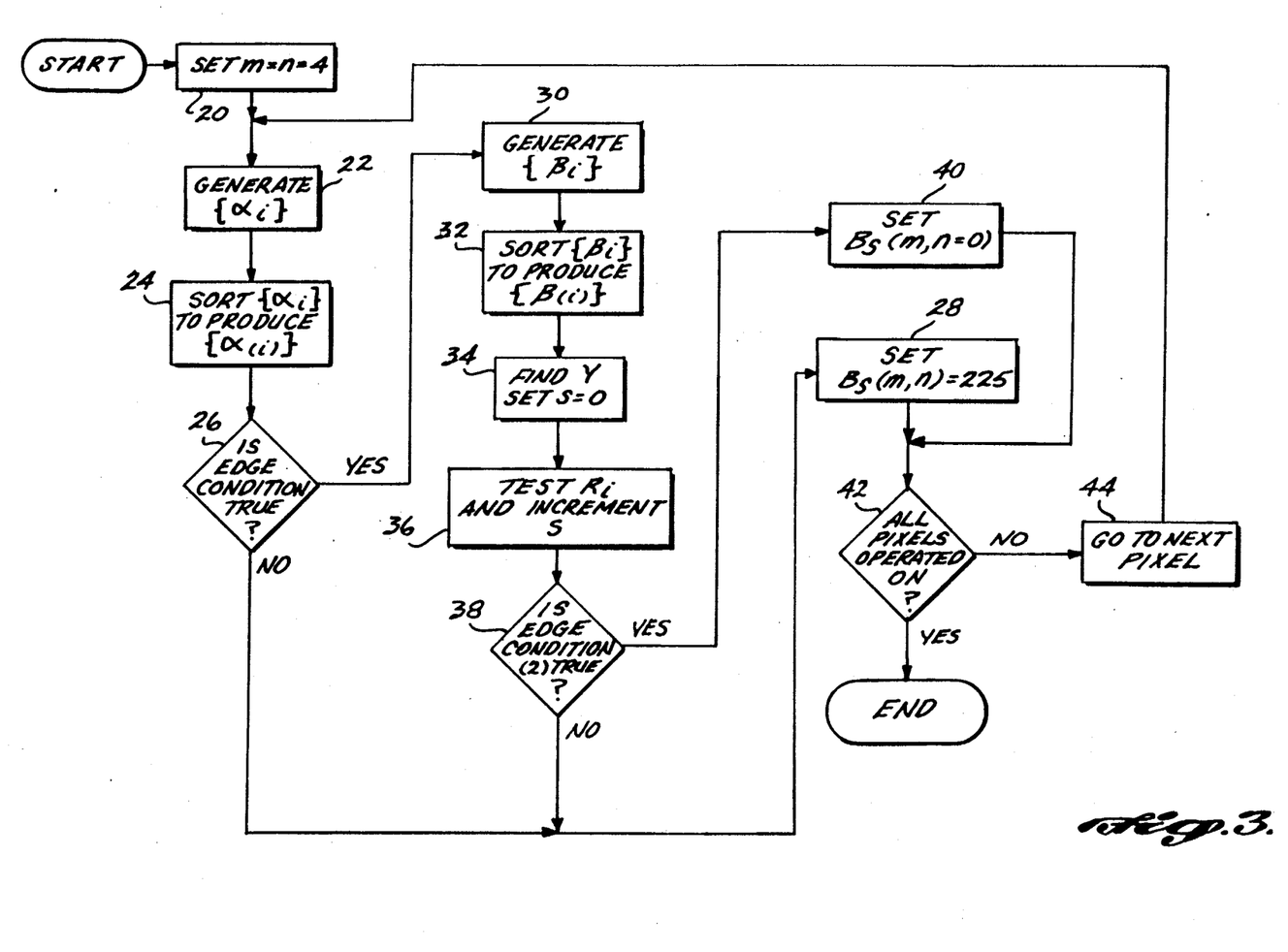
FIG. 3 is a flow diagram of the edge detection process of the present invention.

With reference to FIG. 3, the edge detector analyzes the subimage $\{D_S(m,n)\}$ and generates a corresponding edge subimage $\{B_S(m,n)\}$. The edge subimage is a binary image with each pixel $B_S(m,n)$ taking on a value from the set $\{0, 255\}$. The edge detector treats pixels as having one of only two values, e.g., low or high. The edge detector detects an edge if the pixel value is low and the pixel is in a two-value region. If the edge detector sets $B_S(m,n) = 0$, then $D(m,n)$, the corresponding pixel in the decoded image, is a pixel belonging to an edge. On the other hand, if the edge detector sets $B_S(m,n) = 255$, then $D(m,n)$ is a pixel that does not belong to an edge, i.e., is a nonedge pixel.

With reference to FIG. 3, at block 20, the subimage coordinates are initialized to the lower left corner pixel, i.e., $m = n = 4$. In one actual embodiment, the edge detector begins at the lower left corner of the subimage $\{D_S(m,n)\}$ and scans the subimage from left-to-right, bottom-to-top. At block 22, a sequence $\{\alpha_i\}$, for $i = 0$ to 8, is generated. The sequence $\{\alpha_i\}$ is defined such that:

$$\alpha_i = D_S\left(\left(m - 1 + \left[\frac{i}{3}\right]\right), (n - 1 + i \bmod 3)\right).$$

For any real x, [x] is equal to the integer part of x. The sequence is made up of the values for a $3 \times 3$ image region that is centered around $D_S(m,n)$. The variable $\alpha_4$ is $D_S(m,n)$.

At block 24, the sequence $\{\alpha_i\}$, for all i, is sorted to produce a new sequence $\{\alpha_{(i)}\}$ such that:

$$\alpha_{(0)} \leq \alpha_{(1)} \leq \alpha_{(2)} \leq \ldots \leq \alpha_{(8)}.$$

The edge condition, $$\left[(\alpha_{(7)} - \alpha_{(1)}) > \tau_1 \text{ AND } \alpha_4 < \frac{\alpha_{(7)} + \alpha_{(1)}}{2}\right],$$

is tested at block 26. The first part of the condition tests whether the high and low values in the region, approximately by $\alpha_{(7)}$ and $\alpha_{(1)}$, respectively, have a difference greater than the threshold parameter $\tau_1$. The second part of the condition test is whether the value of $D(m,n)$ is a "low" value. By detecting only low values in two-value regions, the edge detector traces the contour of the low pixel value at any edge in the image. Clearly, by reversing the comparison sign in the second part of the condition test, the edge detector would trace the contour of the high pixel values in the image, If the edge condition is TRUE, then the region is considered to possibly be a two-value region. At block 28, if the condition is FALSE, $D_S(m,n)$ is considered to be a part of a constant region, and $B_S(m,n)$ is set equal to 255; that is, $D_S(m,n)$ is identified as a nonedge pixel.

At block 30, the edge condition tested at block 26 is TRUE and the value at $D_S(m,n)$ might be an edge. To determine whether $D_S(m,n)$ is an edge pixel, the size of the region under consideration is increased and the edge detector attempts to determine whether the region is a two-valued edge region or a nonedge region having textured portions. A second sequence $\{\beta_i\}$, for i=0 to 24, is generated and sorted. The sequence $\{\beta_i\}$, is defined such that:

$$\beta_i = D_S\{(m-2+[i/5]), (n-2+i \bmod 5)\}.$$

The sequence is made up of the values for a 5×5 region that is centered around $D_S(m,n)$. The sequence $\{\beta_i\}$, for all i, is sorted at block 32 in order to produce a new sequence $\{\beta_{(i)}\}$ such that:

$$\beta_{(0)} \leq \beta_{(1)} \leq \beta_{(2)} \leq \ldots \leq \beta_{(24)}.$$

At block 34, a variable $\gamma$ is calculated as:

$$\gamma = \left| \frac{1}{25} \right| \sum_{i=0}^{i=24} \beta_i.$$

Additionally, a counter S is set to 0. At block 36, a set of conditions $R_i$, for all i, is calculated as $$R_i = (\gamma - \beta_i) > \left| \frac{\beta_{(22)}}{\tau_2} \right|.$$

The counter S is incremented for each condition in $\{R_i\}$ that is TRUE. The high value in the region is approximated by $\beta_{(22)}$. At block 38, a second edge condition, $$\left| \frac{S - 12.5}{2.5} \right| < \tau_3,$$

is tested. The condition tests the binomial distribution of the low values over the region compared to a probability limit represented by $\tau_3$. If the condition is TRUE, then the region is considered to be a two-value region. At block 40, $B_S(m,n)$ is set to 0; that is, $D_S(m,n)$ is an edge pixel. Otherwise, at block 28, $B_S(m,n)$ is set to 255; that is, $D_S(m,n)$ is a nonedge pixel. The edge detector acts to mitigate some of the staircase effect by not identifying all of the blocky edge corners as edge pixels. Rather, the edge contours detected by the edge detector are somewhat smoothed.

At block 42, the system determines whether the entire subimage has been scanned by the edge detector. If the condition [(m=m−a) AND (n=N−a)] is TRUE, then the last pixel that was considered, at coordinate (m,n), was the upper right hand pixel in the subimage and subimage $\{B_S(m,n)\}$ is complete. Otherwise, at block 44, the coordinates (m,n) are set to the next subimage pixel to the right, or, if the end of a row is reached, to the first pixel in the next row up. If m=M−a, then the end of the subimage row has been reached and m is reset to a+1 and n is set to n+1. Otherwise, m is set to m+1, so that the next pixel to the right in the same row of the subimage is considered.

Figure 4:
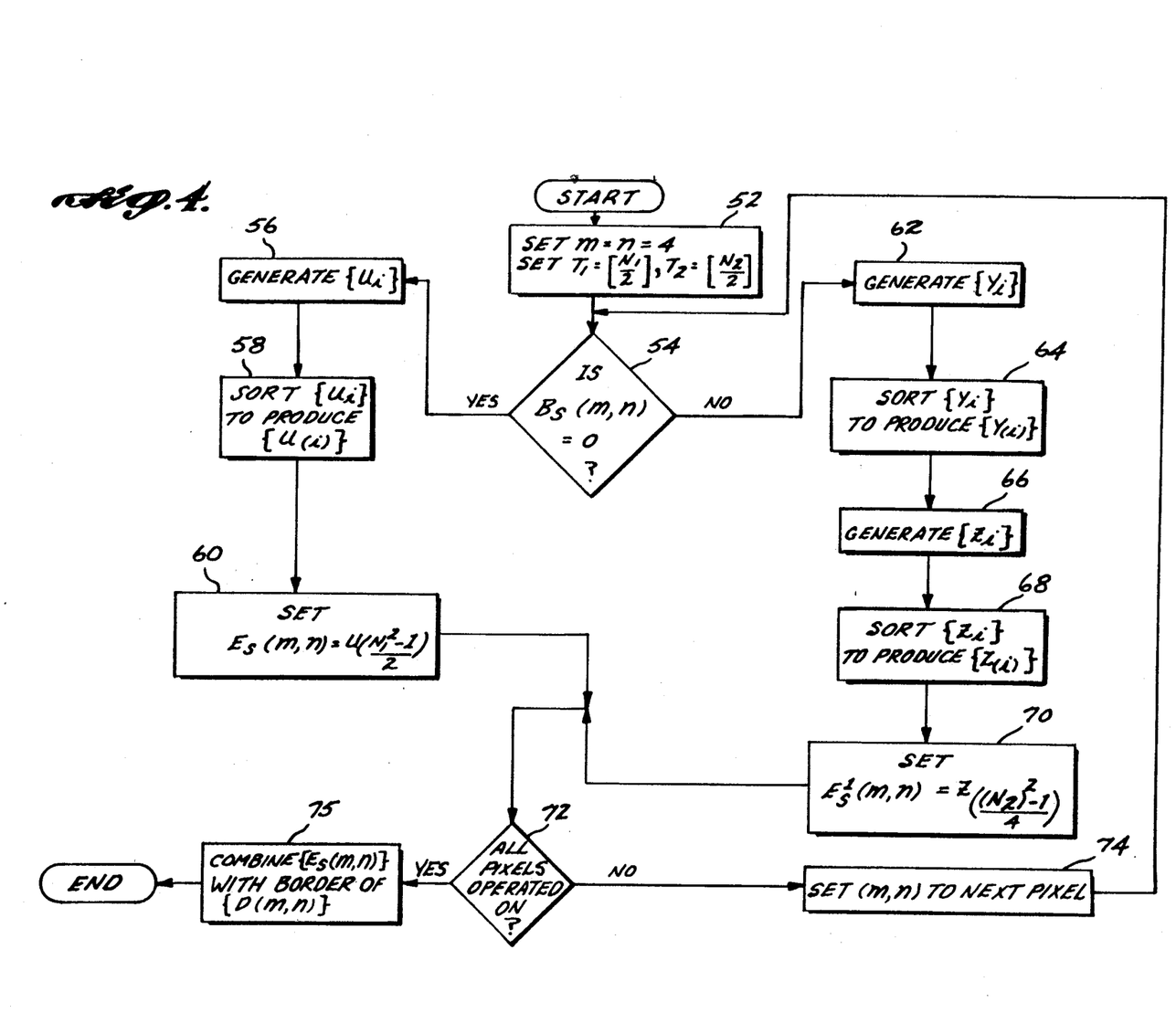
FIG. 4 is a flow diagram of the filtering process of the present invention.

With reference to FIG. 4, the generation of the enhanced image $\{E(m,n)\}$ includes the steps of determining from the edge subimage $\{B_S(m,n)\}$ whether a given pixel is an edge or nonedge pixel and then filtering a region of $\{D(m,n)\}$ around the pixel according to that determination. The filtering process produces filtered values for $\{E(m,n)\}$. If a pixel is identified as an edge pixel, then the median filtering produces a value that is equal to the middle-most value in the region. The steps described in relation to blocks 56–60 generally describe the median filtering process. If a pixel is identified as a nonedge pixel, then the statistical D-filtering causes the enhanced pixel value to be set to an approximated mean value for the region. The steps described in relation to blocks 62–70 generally describe the statistical D-filtering process.

Beginning at block 52, the image coordinate parameters are again set to m=n=4 so that the filtering process begins in the left lower corner of the subimage $\{D_S(m,n)\}$. Window position parameters are initialized as $$T_1 = \left[ \frac{N_1}{2} \right] \text{ and } T_2 = \left[ \frac{N_2}{2} \right].$$

The window position parameters $T_i$ are used to define the position of the filtered pixel region around the pixel $D_S(m,n)$. At block 54, the value of $B_S(m,n)$ is tested to determine whether $D_S(m,n)$ is an edge pixel.

At block 56, with $B_S(m,n)=0$, a sequence $\{u_i\}$, for i=0 to $((N_1)^2-1)$, is defined such that:

$$u_i = D_S\left( \left( m - T_1 + \left[ \frac{i}{N_1} \right] \right), (n - T_1 + i \bmod N_1) \right).$$

Figure 5:
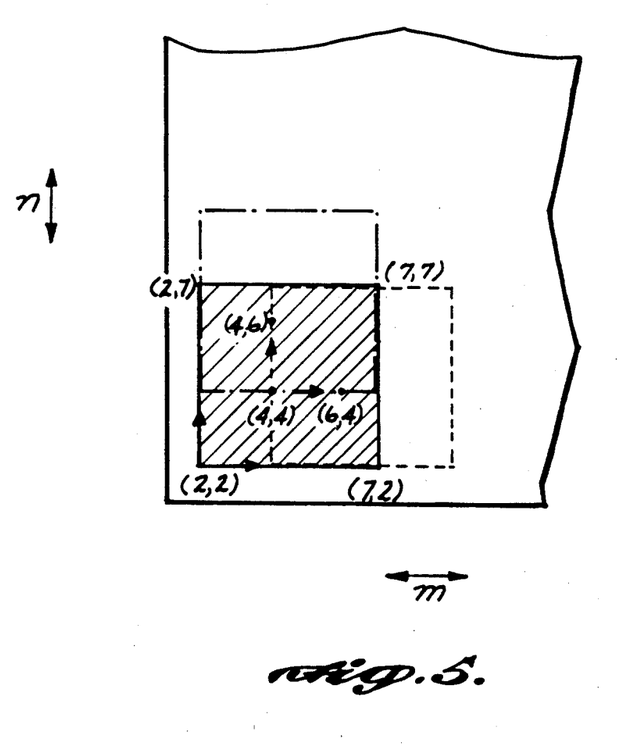
FIG. 5 is an example of a filtering window for filtering an image region via the process carried out in accordance with the flow diagram of FIG. 4.

The sequence $\{u_i\}$ includes the values for a region of $\{D(m,n)\}$ that is defined by the window size parameter $N_1$ and positioned according to position parameter $T_1$. With reference to FIG. 5, the filtering region for the pixel $\{D(4,4)\}$ with window size parameter $N_1=5$ is shown. The 5×5 region has its left lower corner positioned at $\{D(2,2)\}$. The filter windows for $\{D(4,6)\}$ and $\{D(6,4)\}$ are shown in reference and illustrate the repositioning of the filter window relative to the pixel being filtered.

In the present example, a 3-pixel border is left unfiltered. The size of the border allows the system to use a 7'7 maximum size filter window, i.e., $N_1=7$. If a 7×7 filter is used, the lower left corner of the filter window for $\{D(4,4)\}$ is positioned at (1,1), i.e., a corner of image $\{D(m,n)\}$. If the window size parameters are preset, the border parameter may be set so that the maximum subimage is filtered. For example, if it is certain that $N_1$ and $N_2 \leq 3$ then the border may be narrowed to 1-pixel size. In such a case, the corner of the filter window for the pixel at $\{D(2,2)\}$, one of the corner pixels in the subimage, would be positioned at (1,1) and the filtering process would function properly. However, in order to allow the interactive selection of values for the window size parameters, the border parameter size must be adequate to accommodate the largest window filter size that might be selected during the enhancement process.

Referring again to FIG. 4, at block 58, the sequence $\{u_i\}$, for all i, is sorted to produce a new sequence $\{u_{(i)}\}$, such that:

$$u_{(0)} \geq u_{(1)} \geq u_{(2)} \geq \ldots \geq u_{((N_1)^2-1)}.$$

At block 60, the filtered image pixel $E(m,n)$ is set to $u_{((N_1)^2-1)/2}$, i.e., the middle value in the sequence. By scanning and filtering the decoded image in a uniform fashion and by consistently selecting the median value as the filtered value, the edges in the decoded image are enhanced because the staircases are smoothed.

If, at block 54, $B_S(m,n)=255$, then the pixel $D(m,n)$ is a nonedge pixel. At block 62, a sequence $\{y_i\}$, for $i=0$ to $((N_2)^2-1)$, is defined, such that:

$$y_i = D_s\left(\left(m - T_2 + \left[\frac{i}{N_2}\right]\right), (n - T_2 + i \bmod N_2)\right).$$

At block 64, the sequence $\{y_i\}$, for all i, is sorted to produce a new sequence $\{y_{(i)}\}$, such that:
$y_{(0)} \geq y_{(1)} \geq y_{(2)} \geq \ldots \geq y_{((N_2)^2-1)}.$ At block 66, a new sequence $\{z_i\}$, for $i=0$ to $$\frac{((N_2)^2 - 1)}{2}$$

is defined, such that:

$$z_i = \frac{y_{(i)} + y_{((N_2)^2-1-i)}}{2}.$$

The sequence $\{z_i\}$ includes the pair-wise averages of values from $\{y_{(i)}\}$. At block 68, the sequence $\{z_i\}$, for all i, is sorted to produce a new sequence $\{z_{(i)}\}$, such that $$z_{(0)} \geq z_{(1)} \geq \ldots \geq z_{\frac{((N_2)^2-1)}{2}}.$$

At block 70, the filtered image pixel $E(m,n)$ is set equal to $z_{((N_2)^2-1)/4}$, i.e., the middle value of $\{z_{(i)}\}$. $E(m,n)$ is thus set to an approximated mean value of the region. By scanning and filtering the decoded image in a uniform manner, the nonedge region values will be smoothed, i.e., the values across a nonedge region will be made more uniform. Additionally, because of the method by which $\{z_{(i)}\}$ is created, the number of unique pixel values in the image may be increased. In this manner, the contouring effects that appear in quasi-constant or slowly varying regions and the noise effects in textured regions will be reduced.

At block 72, the system determines whether all subimage $\{D_S(m,n)\}$ values have been filtered. At block 74, if the subimage filtering is not complete, then the coordinates $(m,n)$ are updated and the filtering process repeated. The steps at blocks 72 and 74 are similar to the steps described in conjunction with blocks 42 and 44, respectively, of FIG. 3.

The filtering of the complete subimage $\{D_S(m,n)\}$ produces the enhanced subimage $\{E_S(m,n)\}$. At block 75, the combination of the enhanced subimage with the border of the decoded image $\{D(m,n)\}$ produces a complete enhanced image $\{E(m,n)\}$.

Figure 6:
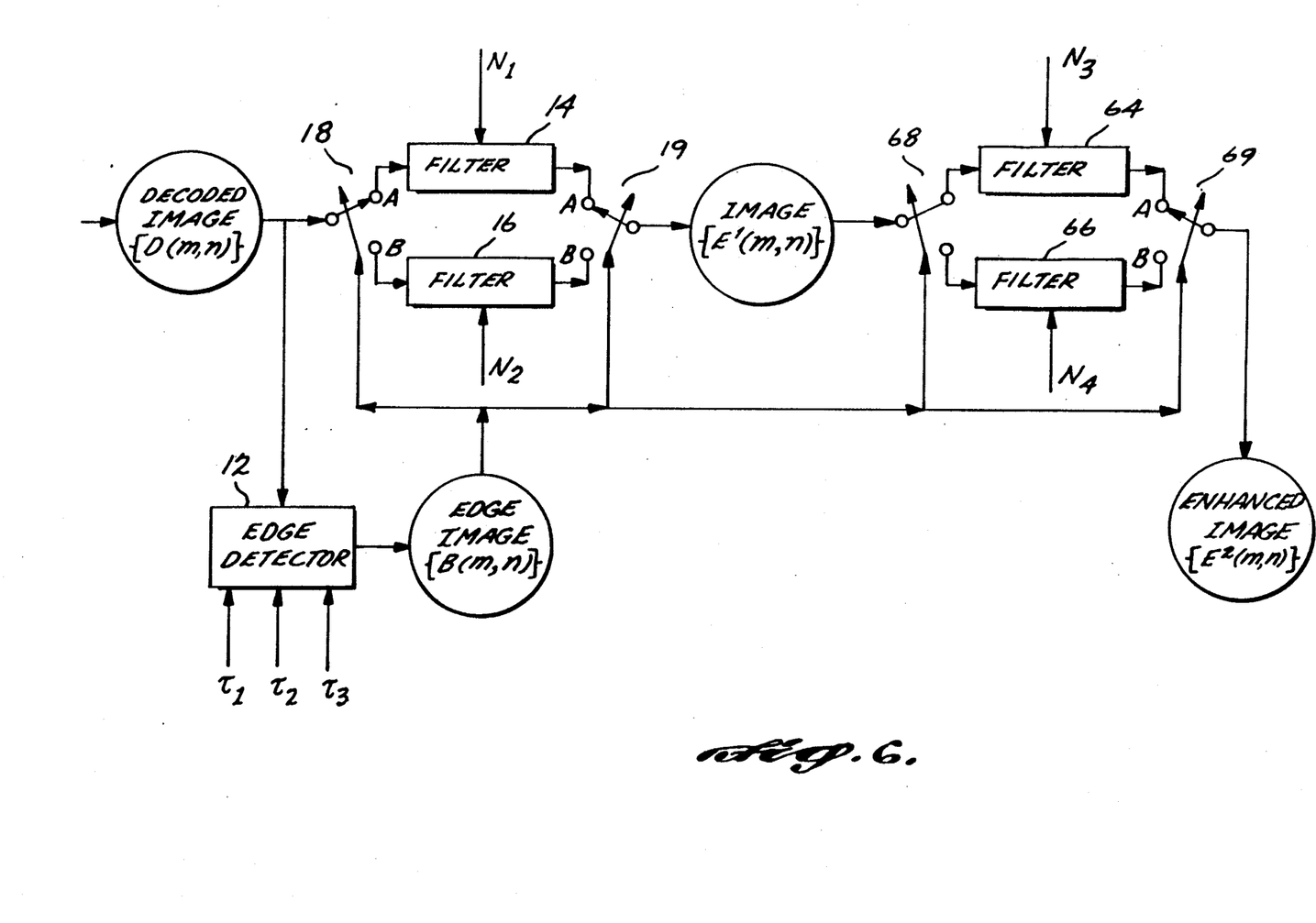
FIG. 6 is a block diagram of a multi-pass enhancement system in accordance with the present invention.

Empirical studies indicate that a second filtering pass whereby the first enhanced subimage, hereafter referred to as $\{E^1(m,n)\}$ is filtered to produce $\{E^2(m,n)\}$ further enhances the quality of the output image. As an example of one preferred enhancement system for multi-pass filtering, with reference to FIG. 6, the system includes the edge detector 12, the filters 14 and 16, and the switches 18 and 19 described in conjunction with the single-pass filtering system. Additionally, the enhancement system includes a second set of filters, nonedge filter 64 and edge filter 66, and switches 68 and 69. The filters 64 and 66 are nonedge and edge filters similar to filters 14 and 16. During the second pass of filtering, values for the window size parameters $N_3$ and $N_4$ of filters 64 and 66, respectively, are selected so as to enhance the image in a slightly different manner than was done by filters 14 and 16. For example, it has been found that parameter settings of $N_1N_3=5$ or 7, $N_2=3$ and $N_4=1$ minimize or essentially remove the staircase effects created by a vector quantizer.

Figure 7:
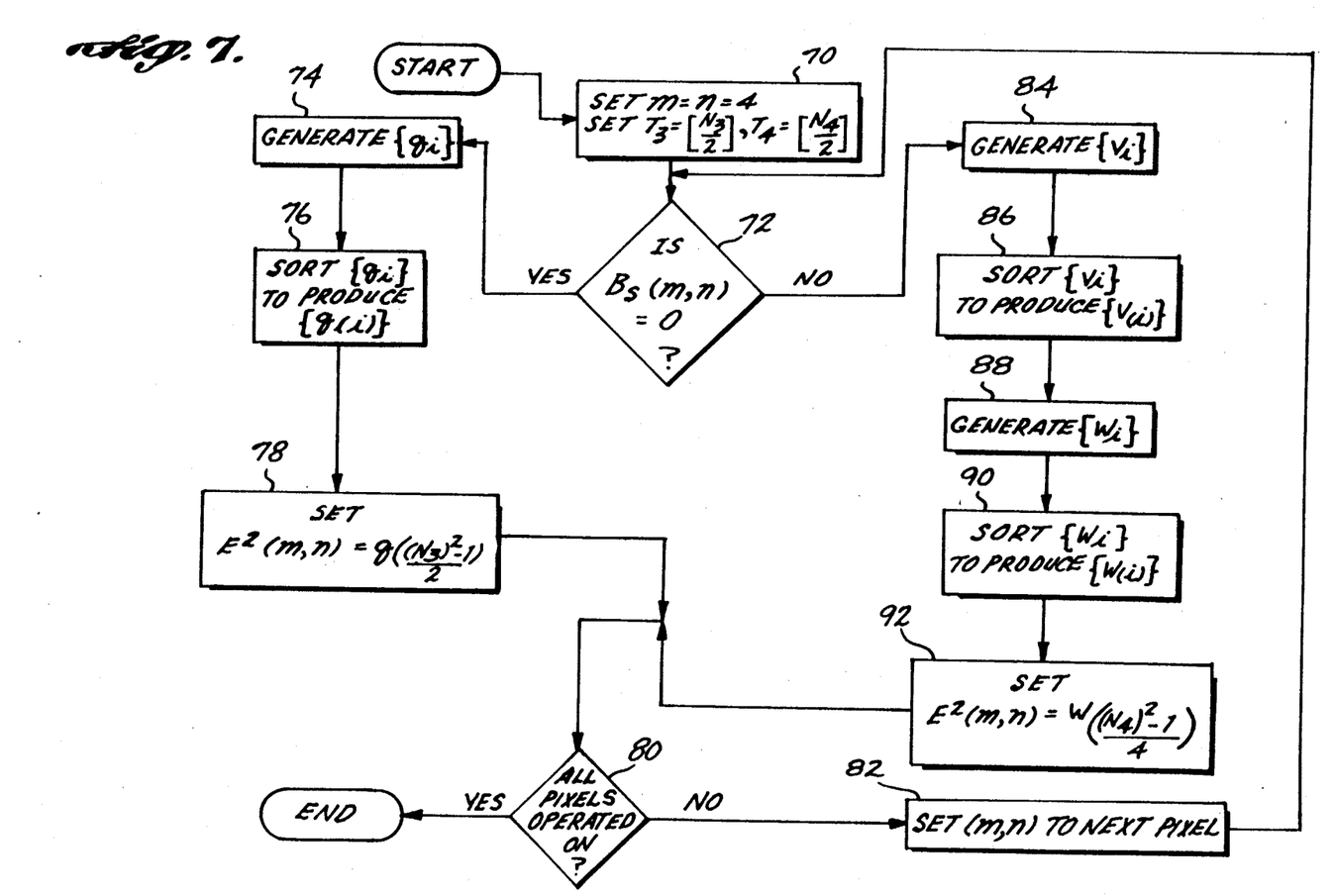
FIG. 7 is a flow diagram of the second filtering pass in a multi-pass enhancement system in accordance with the block diagram of FIG. 6.

With reference to FIG. 7, the steps invovled in the generation of $\{E^2(m,n)\}$ are similar to the steps for generating the first enhanced image $\{E^1(m,n)\}$. At block 70, coordinates m and n are set to 4 for a 3-pixel border around the subimage. Additionally, the window position parameters are initialized as $$T_3 = \left[\frac{N_3}{2}\right] \text{ and } T_4 = \left[\frac{N_4}{2}\right].$$

As block 72, if $B(m,n)=0$, that is $D(m,n)$ is an edge pixel, then at block 74, a sequence $\{q_i\}$, for $i=0$ to $((N_3)^2-1)$, is defined, such that:

$$q_i = E_s^1\left(\left(m - T_3 + \left[\frac{i}{N_3}\right]\right), (n - T_3 + i \bmod N_3)\right).$$

The sequence $\{q_i\}$, for all i, is sorted at block 76 to generate a new sequence $\{q_{(i)}\}$, such that:
$q_{(0)} \geq q_{(1)} \geq q_{(2)} \geq \ldots \geq q_{((N_3)^2-1)}.$ At block 78, the image pixel $E^2(m,n)$ is set to equal $q_{((N_3)^2-1)/2}$, i.e., the middle value in the region.

At blocks 80 and 82, the coordinates $(m,n)$ are updated to the next pixel in $\{E_S^1(m,n)\}$ in a manner similar to that carried out at blocks 42 and 44, respectively, in FIG. 3.

If $B_S(m,n)=255$, that is $D(m,n)$ is a nonedge pixel, then at block 84, a sequence $\{v_i\}$, for $i=0$ to $((N_4)^2-1)$, is generated such that:

$$v_i = E_s^1\left(\left(m - T_4 + \left[\frac{i}{N_4}\right]\right), (n - T_4 + i \bmod N_4)\right).$$

The sequence $\{v_i\}$, for all i, is sorted at block 86 to produce a new sequence $\{v_{(i)}\}$, such that:

$v_{(0)} \geq v_{(1)} \geq v_{(2)} \geq \ldots \geq v_{((N_4)^2-1)}.$

At block 88, a sequence $\{w_i\}$, for $i=0$ to $$\frac{((N_4)^2 - 1)}{2},$$

is defined, such that:

$$w_i = \frac{v_{(i)} + v_{((N_4)^2-1-i)}}{2}$$

The sequence $\{w_i\}$, for all i, is sorted at block 90 to produce a new sequence $\{w_{(i)}\}$, such that $$w(0) \geq w(1) \geq w(2) \geq \ldots \geq w\,\underline{((N_4)^2 - 1)}.$$
$$2$$

At block 92, the image pixel $E^2(m,n)$ is set to $w((N_4)^2-1)/4$. Beginning at block 80, the coordinates $(m,n)$ are updated to the next pixel in the subimage. When each subimage pixel from $\{E_s^1(m,n)\}$ has been filtered, the border for $\{E^2(m,n)\}$ is set to the border from $\{E^1(m,n)\}$ to complete the enhanced image $\{E^2(m,n)\}$.

Empirical studies illustrate the various enhancement qualities obtained for different window size parameter settings. If $N_1=N_2=N_3=N_4=1$, the enhancement system produces an enhanced image $\{E^2(m,n)\}$ that is identical to the decoded image $\{D(m,n)\}$, i.e., an identical unenhanced image. If $N_1=3$ and $N_2=N_3N_4=1$, a slight improvement is notices on edge areas and discontinuities present on the edges are moderately smoothed. If $N_1=N_3=3$, then the edge smoothing is increased. If $N_1=N_3=5$, and $N_2=3$, moderate improvements are perceptible in the edge and nonedge regions. If $N_1$ and $N_3$ are increased to 7, additional improvements are visible in both edge and nonedge regions. Finally, if $N_2>3$, the nonedge regions are smoothed to a great extent and a fuzzy image is obtained. Although in these examples, $N_4=1$ and is thus an identity filter, other values for $N_4$ can be used to alter the enhanced image.

Figure 8:
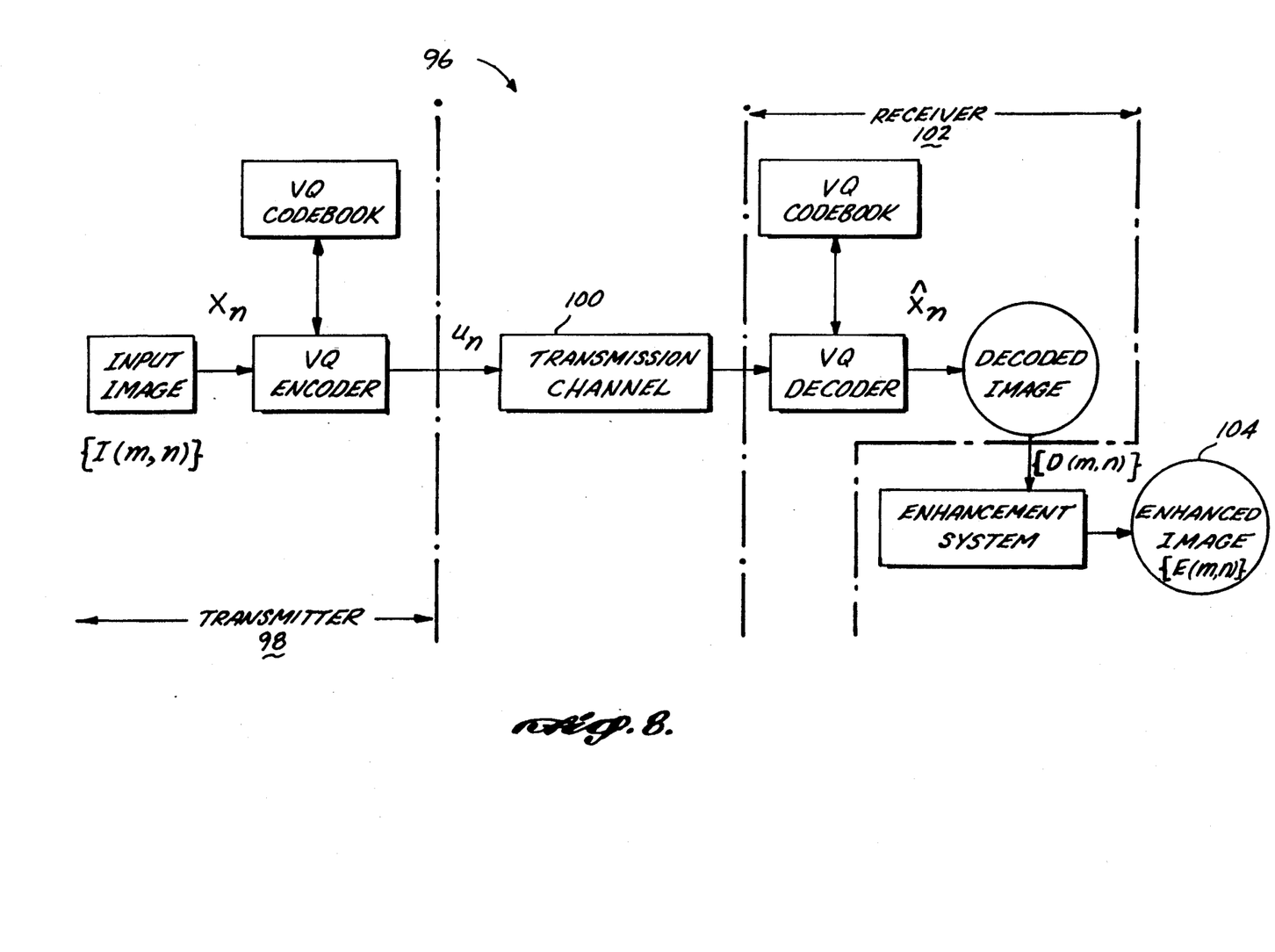
FIG. 8 is a block diagram of a vector quantization and digital image transmitting system into which the image enhancement system is integrated.

As shown in FIG. 8, a typical vector quantization image transmitting system 96 includes a transmitter 98, a transmission channel 100, and a receiver 102. In a vector quantizer transmitting system, the transmitter includes a vector quantizer codebook and encoder; the receiver includes the same codebook and a decoder. The decoder produces a decoded image from the encoded output vector representation that is received. The enhancement system 104 of the present invention processes the decoded image $\{D(m,n)\}$ to produce an enhanced image $\{E(m,n)\}$. It is to be understood that any image suffering from the problems of staircase effects, contouring effects, and/or loss of detail and granular noise, may be enhanced by enhancement system 104. The vector quantization example illustrates one application of the enhancement system.

In one actual embodiment, the enhancement system of the present invention is incorporated into a SUN 3/60 workstation including a color monitor. The monitor provides 1152×900 pixel resolution. The color monitor is capable of displaying 256 levels of grey for each pixel. The image that is enhanced may be generated by a number of sources such as a television camera, an image scanner, etc. The image to be enhanced may be a prestored image, in which case the data describing the image are stored in memory space accessible to the workstation. Alternatively, the image may be enhanced in real time, i.e., as it is generated and decoded at the workstation.

One benefit of the present enhancement system is that it can be integrated into an interactive system and the edge threshold parameters and the window size parameters may be set interactivley. Additionally, an operator may select multipass filtering and input the parameter values to be used in each pass. An operator who is familiar with the operation of the enhancement system and who has viewed the decoded image $\{D(m,n)\}$ may select and input values for the parameters to obtain the most desirable enhancement based on the content of the decoded image. Using an interactive method, several enhanced images generated by systems using different parameter values may be produced and compared. The enhanced image with the most satisfactory quality can then be chosen and used as the final enhanced image.

While preferred embodiments of the invention have been illustrated and described, it will be appreciated that various changes can be made therein without departing from the spirit and scope of the invention. Generally, the invention is suitable for use with any number of image processing systems that process digital images that have been previously encoded or processed in a manner such that image fidelity has been decreased.

Edge detectors and filters other than those described in the illustrative examples may be used. For example, a thresholded Laplace operator and a thresholded Sobel operator may be used as the edge detector. Multi-pass filtering of the image may be done with various combinations of edge and nonedge filters being used.

An additional benefit of the present invention is that by analyzing the decoded image $\{D(m,n)\}$ via an edge detector the edge information may be used for other processes. For example, it has been found that an additional reduction in contouring effects in the nonedge region is obtained by adding uniformly distributed random noise between $+5$ and $-5$ db to the decoded image. Thus, after the nonedge regions are filtered, an additional pass may be made over the nonedge regions in order to add the random noise.

The present invention is useful in designing high quality image transmitting systems with existing analog telephone networks or digital networks like DDS, ISDN or PSDN. An immediate application is conceived to be in high quality facsimile transmission systems.

The embodiments of the invention in which an exclusive property or privilege is claimed are defined as follows:

1. A method for digital image enhancement using a processing system including means for receiving and displaying image comprised of decoded pixel digital data, the data defining edge and nonedge regions in the image, the method comprising the steps of:
   (a) receiving a digital image:
   (b) differentiating between edge pixel data and nonedge pixel data in said digital image;
   (c) filtering each edge pixel by identifying a first edge image region, said first edge image region including said edge pixel, and determining a filtered edge pixel value based on pixel data in said first edge image region, such that the staircase effects appearing when said filtered edge pixels are displayed are decreased;
   (d) filtering each nonedge pixel by identifying a first nonedge image region, said fist nonedge image region including said nonedge pixel, and determining a filtered nonedge pixel value based on pixel data in said first nonedge image region, such that the loss of detail and contouring effects appearing when said filtered nonedge pixels are displayed are decreased; and
   (e) combining said filtered edge pixel data and said filtered nonedge pixel data to form an enhanced image.

2. A method as claimed in claim 1, wherein said method further includes the steps of: refiltering each edge (a) pixel by identifying a second edge image region, said second edge image region including said edge pixel, and determining a refiltered edge pixel value based on pixel data in said second edge image region, such that the staircase effects appearing in said edge region data when said refiltered edge pixels are displayed are further decreased;

(b) filtering each nonedge pixel by identifying a second nonedge image region, said second nonedge image region including said nonedge pixel, and determining a refiltered nonedge pixel value based on pixel data in said second nonedge image region, such that staircase effects appearing in said nonedge region data when said refiltered nonedge pixels are displayed are further decreased; and (c) combining said refiltered edge region pixel data and said refiltered nonedge region pixel data to form a second enhanced image.

3. A method as claimed in claim 1, wherein prior to differentiating between the edge and nonedge regions, a subimage of said digital image is formed, such that said digital image is comprised of said subimage and an unfiltered portion of said digital image, said edge and nonedge data of said subimage are differentiated, filtered, and combined to form an enhanced subimage, and said enhanced image is formed by combining said enhanced subimage with said unfiltered portion of said digital image.

4. A method as claimed in claim 1 or 2, wherein said step of differentiating between edge and nonedge regions is carried out by analyzing said digital image via an edge detector.

5. A method as claimed in claim 1, further comprising the step of adding random noise to said nonedge data after said step of filtering said nonedge data.

6. A method as claimed in claim 1 or 2, wherein said step of determining a filtered edge pixel value based on pixel data in an edge image region includes the steps of ordering said pixel data in said edge image region, and selecting a median value from said ordered pixels as said filtered edge pixel value.

7. A method as claimed in claim 1 or 2, wherein said step of determining a filtered nonedge pixel value based on said pixel data in a nonedge image region includes the steps of approximating a mean value for said pixel data in said nonedge image region via a statistical D-filtering process, and selecting said approximated mean value as said filtered nonedge pixel value.

8. A method as claimed in claim 1 or 2, wherein said step of differentiation requires edge identification threshold parameters, and said edge image regions and said nonedge image regions are defined by window parameters, and said method further includes the step of receiving values for said threshold parameters and said window parameters prior to the steps of differentiating and filtering.

9. An apparatus for enhancing a digital image, said digital image comprised of decoded digital data, the decoded digital data defining edge and nonedge regions in the image, said apparatus comprising:

(a) means for receiving a digital image;

(b) edge detection means for differentiating between the edge pixel data and the nonedge pixel data in said digital image;

(c) nonlinear edge filtering means for filtering each said edge pixel data by identifying a first edge image region including a plurality of pixels such that the staircase effects in said filtered edge pixel data are decreased;

(d) nonlinear nonedge filtering means for filtering each said nonedge pixel data by identifying a first edge image region including a plurality of pixels such that the loss of detail and contouring effects in said filtered nonedge pixel data is decreased; and (e) combination means for combining said filtering edge pixel data and said filtered nonedge pixel data to produce an enhanced digital image.

10. An apparatus as claimed in claim 9, wherein said nonlinear edge filtering means is a median filter.

11. An apparatus as claimed in claim 9, wherein said nonlinear nonedge filtering means is a statistical D-filter.

* * * * *